Dec. 5, 1944.  B. WILKINSON  2,364,332
HOSE PIPE
Filed Nov. 9, 1942
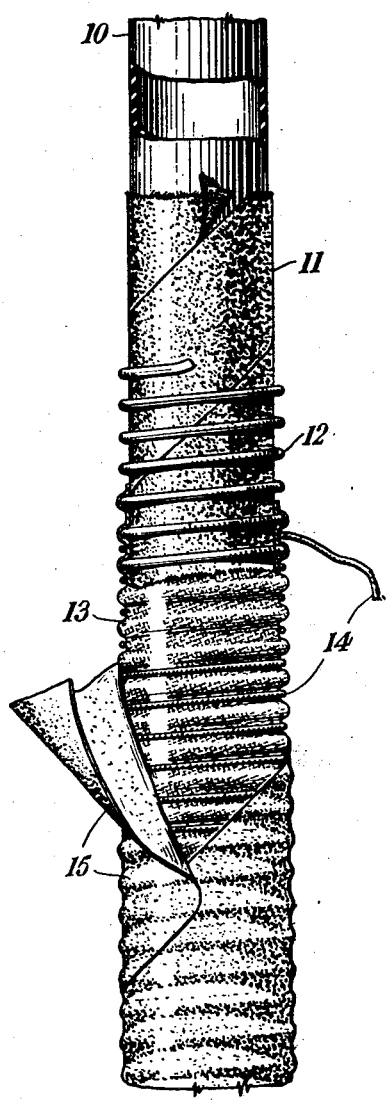
INVENTOR
BERNARD WILKINSON
By Watson, Cole, Grindle & Watson
ATTYS Patented Dec. 5, 1944

2,364,332

UNITED STATES PATENT OFFICE 2,364,332

HOSE PIPE

Bernard Wilkinson, London, England, assignor to Wilkinson Rubber Linatex Limited, London, England, a company of Great Britain Application November 9, 1942, Serial No. 465,047
In Great Britain April 22, 1942

5 Claims. (Cl. 138—55)

This invention relates to flexible hose pipes of the kind having a helical reinforcing winding. These hoses are generally made of rubber and embody a layer or layers of fabric where extra strength is necessary. The reinforcing winding, which serves to increase the flexibility of the hose and prevent it from kinking, is generally of metal wire. Metal wire is however disadvantageous because of its resistance to deformation under small loads, which renders it difficult to fit clips to the hose for securing it to a supporting fitting, and of its tendency to take a permanent set, as for example when the hose is accidentally trodden on, which may render the hose useless.

With a view to overcoming the disadvantages of the metal wire reinforcement, it has been proposed to substitute for it a helical winding of hard rubber. Hard rubber however softens at about 100° C. which means that a hose with a hard rubber reinforcing helix is of no use for conveying hot oil or steam, as the softening of the helix causes the hose to collapse when flexed.

The flexible hose pipe according to the invention is characterised by the incorporation therein of a helix of regenerated cellulose embedded in the structure of the hose. This material will stand fairly high temperatures of the order of 150° C. without undue softening or deterioration. Although regenerated cellulose will deform under small loads and so allow clips to be fitted to the pipe, it does not easily take a permanent set, but regains its shape after sudden deformation.

The hose pipe may be constructed of rubber, either natural or synthetic, of a composition suited to the intended use of the hose. Thus, if the hose pipe is to be used for water or steam, it may be made of ordinary rubber (compounded to resist heat in the case of steam) whereas if it is to be used for carrying acids, it will be made of acid-resisting rubber. Again, if it is to be used for petrol or oil, it will be made of a petrol-resisting rubber or of a synthetc rubber such as neoprene or the material hold under the British registered trade-mark Thiokol. The pipe may also be built up of flexible plastic materials, for example polyvinyl chloride. Layers of fabric may be included, on either side of the helix, or fabric may be introduced on both sides of the helix.

Where the pipe consists wholly or mainly of rubber, it is preferred to build up the pipe of uncured or partially cured rubber and to subject it to vulcanisation after completion, so as to ensure that the helix will become securely embedded in the rubber. With synthetic rubber or other plastic materials, a similar heat treatment after manufacture is generally desirable, to ensure embedding of the helix, setting of the joints, and curing of the materials. With plastic materials such as polyvinyl chloride, however, the heat treatment is not always necessary, and can be dispensed with if appropriate cements are used.

One form of pipe according to the invention may be constructed by mounting a rubber tube on a mandrel, then winding regenerated cellulose wire around the rubber to form a helix (or slipping a preformed helix of regenerated cellulose wire over the rubber) then applying a layer of rubberised fabric, then applying an external layer of rubber, and finally vulcanising the pipe. As explained above, the fabric may be omitted altogether if desired, or alternatively a second layer of rubberised fabric may be applied inside the helix. The outer layer of rubber may consist of a preformed tube or may be formed by wrapping rubber sheet around the partially completed structure on the mandrel.

Another form of pipe according to the invention consists of an inner tube of a flexible synthetic material, for example polyvinyl chloride, a surrounding layer of fabric having rubber on its outer surface, then a helix of regenerated cellulose, then a layer of fabric with rubber on the inside and finally an external layer of natural rubber, synthetic rubber or appropriate plastic material, the whole being vulcanised after construction to embed the helix in the rubber carried on the layers of fabric.

If desired, the pipe according to the invention may have an external layer of fabric for protecting it against abrasion.

In United States application Serial No. 376,204 I have described a self-sealing petrol pipe embodying a helix of regenerated cellulose. This helix was located at the interior of the pipe and so exposed to the liquid flowing through the pipe. Regenerated cellulose however softens in water, and water is generally present in small quantities in petrol or oil. In the case of the pipe according to the invention, however, the regenerated cellulose is protected from the liquid and the pipe will moreover have the considerable advantage of a smooth bore.

One construction of pipe according to the invention will now be described in greater detail, by way of example, with reference to the accompanying drawing. The pipe has a core 10, consisting of an extruded tube of polyvinyl chloride which is slipped on to a mandrel on which the pipe is built up.

Around the core is wound a layer 11 of fabric, coated on its inner surface with the cement sold under the British trade-mark "Cellon-Linatex" and rubberized on its outer surface. Around this is a helical winding 12 of regenerated cellulose wire. Surrounding this is a second layer 13 of fabric rubberized on both sides. Then comes a helix 14 of hemp cord or the like, the convolutions of which are out of register with those of the helix 12 of regenerated cellulose. Finally, there is an external layer 15 of fabric, rubberized on both sides and applied in overlapping windings. Preferably the rubber on all of the fabric layers is uncured, or only partially cured, the pipe being vulcanised after assembly, so as to bond all the constituent layers securely together. The rubber on the outer surface of the external layer 15 of fabric may, however, be pre-vulcanised. As an alternative to bonding the layers by vulcanisation of the rubber coatings applied to them, this may, if desired, be effected by the use of suitable rubber cements or plastic cements which will form a bond without curing.

It is important that all the layers should be bonded together, and in particular that the fabric layers 11, 13, should be bonded between the convolutions of regenerated cellulose and helix 12, so as to prevent relative movement between the latter and the core 10. It will be appreciated that the helix 12 acts as a stiffening for the whole pipe, and that unless the core 10 were bonded to it the core would tend to collapse, having very little natural strength. The cord winding 14 assists to secure intimate bonding between the fabric layers 11, 13, makes the pipe stronger and assists it to bend when required. The external layer 15 serves as a protective covering for protecting the pipe against abrasion, moisture and the effects of fluids spilt on the outside of the pipe.

Instead of using layers of fabric coated with rubber as described above, I may use layers of fabric coated with polyvinyl chloride cement, thus producing a flexible pipe embodying no rubber at all in its construction. The constituent layers of the pipe will be securely bonded together by the polyvinyl chloride cement and an external coating of polyvinyl chloride on the outermost fabric layer 15 will protect the pipe against abrasion, moisture and the effects of fluids spilt on it.

The new pipe is capable of the most varied uses and will stand up to high temperatures. Thus it may be used as an oil hose for aircraft, where the temperature of the oil will be of the order of 150° C.

What I claim as my invention and desire to secure by Letters Patent is:

1. A flexible hose pipe, comprising a core consisting of an inner tubular layer of a flexible synthetic material, an inner layer of fabric bonded to the core, a surrounding reinforcing helix of regenerated cellulose wire, an outer fabric layer outside said helix and bonded to the inner fabric layer between the convolutions thereof, said inner and outer bonded layers of fabric holding the reinforcing helix against movement relative to the core, and an external protective covering bonded to said outer fabric layer.

2. A flexible hose pipe, comprising a core consisting of an inner tubular layer of a flexible synthetic material, an inner layer of fabric bonded to the core, a surrounding reinforcing helix of regenerated cellulose wire, an outer fabric layer outside said helix and bonded to the inner fabric layer between the convolutions thereof, a helix of cord around said outer fabric layer with its convolutions out of register with those of the helix of synthetic material, and an external protective covering bonded to said outer fabric layer.

3. A pipe as claimed in claim 2, in which the core consists of polyvinyl chloride and the constituent layers of the pipe are bonded together by polyvinyl chloride cement.

4. A flexible hose pipe, comprising a core consisting of an inner tubular layer of a flexible synthetic material, an inner layer of rubberized fabric bonded to the core, a surrounding reinforcing helix of regenerated cellulose wire, an outer layer of rubberized fabric outside said helix and bonded to the inner layer between the convolutions thereof, a helix of cord surrounding the outer fabric layer and having its convolutions out of register with those of the regenerated cellulose helix, and an outer covering of rubberized cloth bonded to the outer fabric layer.

5. A flexible hose pipe, comprising a core consisting of an inner tubular layer of a flexible synthetic material, an inner layer of fabric bonded to the core, a surrounding reinforcing helix of regenerated cellulose wire and an outer fabric layer outside said helix and bonded to the inner fabric layer between the convolutions thereof, said inner and outer bonded layers of fabric holding the reinforcing helix against movement relative to the core.

BERNARD WILKINSON.